United States Patent [19]

Chin et al.

[11] Patent Number: 5,678,018
[45] Date of Patent: Oct. 14, 1997

[54] CACHE ADDRESS MODIFICATION CONTROL

[75] Inventors: Henry Chin, Wappingers Falls; George Totolos, Jr., Poughkeepsie, both of N.Y.

[73] Assignee: International Business Machines Corporation, Armonk, N.Y.

[21] Appl. No.: 357,840

[22] Filed: Dec. 16, 1994

[51] Int. Cl.$^6$ .................................................. G06F 12/02
[52] U.S. Cl. ................................................ 395/403; 395/445
[58] Field of Search .............................. 395/403, 442, 395/497.03, 497.04, 445

[56] References Cited

U.S. PATENT DOCUMENTS

| | | |
|---|---|---|
| 3,898,631 | 8/1975 | Brown et al. . |
| 4,096,567 | 6/1978 | Millard et al. . |
| 4,654,787 | 3/1987 | Finnell ............... 395/497.03 |
| 4,853,846 | 8/1989 | Johnson et al. . |
| 4,947,319 | 8/1990 | Bozman . |
| 5,012,408 | 4/1991 | Conroy ............... 395/497.03 |
| 5,056,060 | 10/1991 | Fitch ....................... 395/823 |
| 5,175,833 | 12/1992 | Yarkoni et al. . |
| 5,175,836 | 12/1992 | Morgan ............... 395/797.03 |
| 5,202,968 | 4/1993 | Sato . |
| 5,446,860 | 8/1995 | Dresser .................. 395/427 |
| 5,511,180 | 4/1996 | Schieve ............... 395/497.03 |

OTHER PUBLICATIONS

IBM Technical Disclosure Bulletin, vol. 36, No. 12, Dec. 1993, pp. 613–616, "Method of Accessing Uniquely Identically Addressed Input/Output Ports", E. Schorn.

IBM Technical Disclosure Bulletin, vol. 35, No. 1A, Jun. 1992, pp. 375–376, "Dynamically Resizing The Cache Control Table to Improve Working Set", Cox et al.

*Primary Examiner*—Tod R. Swann
*Assistant Examiner*—Christopher S. Chow
*Attorney, Agent, or Firm*—Marc A. Ehrlich

[57] ABSTRACT

A cache memory is provided which adjusts its response to addresses in accordance with the number of identical cache memory cards installed in the motherboard. Upon its installation in the motherboard a card is informed of its status as a master or a slave. As long as a slave is not installed the master responds to processor accesses over the entire address range of the computer. When a slave is installed a signal is sent to the master. Circuitry on the memory cards restricts the master response to half the address range. The slave being informed of its status restricts its response to the other half of the address range.

13 Claims, 4 Drawing Sheets

CYCLE    0 1 2 3 4 5 6 7 8 9 10 11 12 13 14 15

CLOCK

START FLUSH

BUDDY

END FLUSH

FIG.5

CACHE ADDRESS MODIFICATION CONTROL

FIELD OF INVENTION

The present application relates to cache memories and more particularly cache memories that are expandable in modular units.

BACKGROUND OF THE INVENTION

Modularity of storage elements allows for addition of storage capacity to computer systems in segments. Mechanisms are generally provided in computer systems to determine the amount of installed main memory and to adjust memory addressing to accommodate changes in installed memory capacity. For instance, Brown et al., U.S. Pat. No. 3,898,631, issued on Aug. 5, 1975 and entitled "Storage Indicator", discloses apparatus to sense and provide a digital indication of the number of installed segments where each segment is on a separate memory card. The insertion of each memory card into a connector in the memory board transmits a signal to a logic circuit that provides a binary count of the number of installed segments.

In certain situations, the system is not able to respond to information about changes in a memory's configuration. For instance, a computer system's memory hierarchy may consist of a level 1 ($L_1$) cache, a level 2 ($L_2$) cache, a main memory random access memory (RAM) and storage on a magnetic media. The $L_2$ cache resides between the $L_1$ cache and main memory to help speed up accesses on frequently requested data. While the system may be able to adjust its addressing to changes in the size of the RAM, it is difficult to do so with respect to a cache. Without a change in the addressing by the system processor the $L_2$ cache is unable to adapt to changes in its capacity without being provided with some "intelligence" to split memory accesses in accordance with $L_2$ cache capacity. One solution is to "throw out" the original $L_2$ cache unit and replace it entirely with a larger capacity cache unit that will appropriately access its added capacity.

BRIEF DESCRIPTION OF THE INVENTION

In accordance with the present invention, expansion of cache size is in modular units accomplished by addition of circuitry which enables each of the modular units to detect the presence or absence of other units in the cache unit and adjust their addressable ranges to appropriately respond to processor instructions. Insertion of a modular unit into the motherboard informs the unit of its status in the cache either as a master or a slave. A line in the motherboard interconnecting the modular units informs the other unit of its presence. Circuitry responsive to the presence or absence of the signals adjusts the range of addresses accepted by each of the modular units.

Therefore, it is an object of the present invention to provide for automatic adaption of modular units to changes in the quantity of installed storage.

It is another object of the present invention to provide for a cache memory which is expandable in modular units.

The foregoing and other objects, features and advantages of the present invention will be apparent from the following description of a preferred embodiment of the invention as illustrated in the accompanying drawings of which:

DESCRIPTION OF THE DRAWINGS

FIG. 5 is a timing diagram for a flush cycle of the $L_2$ cache.

DETAILED DESCRIPTION

Figure 1:
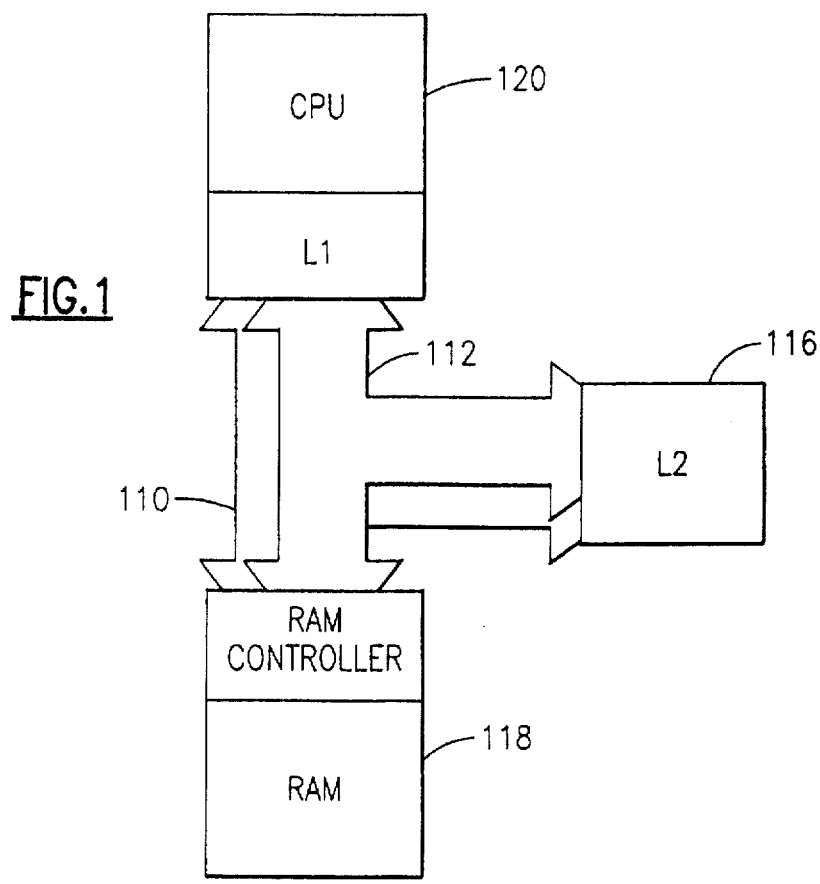
FIG. 1 is a block diagram of main memory and the $L_1$ and $L_2$ caches linked together by data and address busses.

Referring now to FIG. 1, a data buss 110 and an address and a control line buss 112 are shown linking the $L_2$ cache 116 to the $L_1$ cache 114, the random access main memory (RAM) 118 and the central processing unit (CPU) 120. The various memory units 114 to 118 respond to instructions of the CPU 120. The $L_1$ cache is the fastest and most costly per bit of the three memory units. The response of the $L_2$ cache is not quite as fast as that of the $L_1$ cache and its cost per bit is less. The RAM is the slowest of the three units and cost the least per bit.

The sizes of the $L_1$, $L_2$ and RAM memories are in inverse proportion to their speed. The $L_2$ cache stores a portion of the content of the RAM while the $L_1$ cache contains a portion of the entries of the $L_2$ cache. The disclosed arrangement is part of a personal computer system using an Intel Pentium microprocessor. The microprocessor configuration and requirements for a system using that microprocessor can be found in a manual entitled "Pentium Family Users Manual Volume 1: Data Book" published by the Intel Corporation in 1994. This manual is hereby incorporated by reference.

Figure 2:
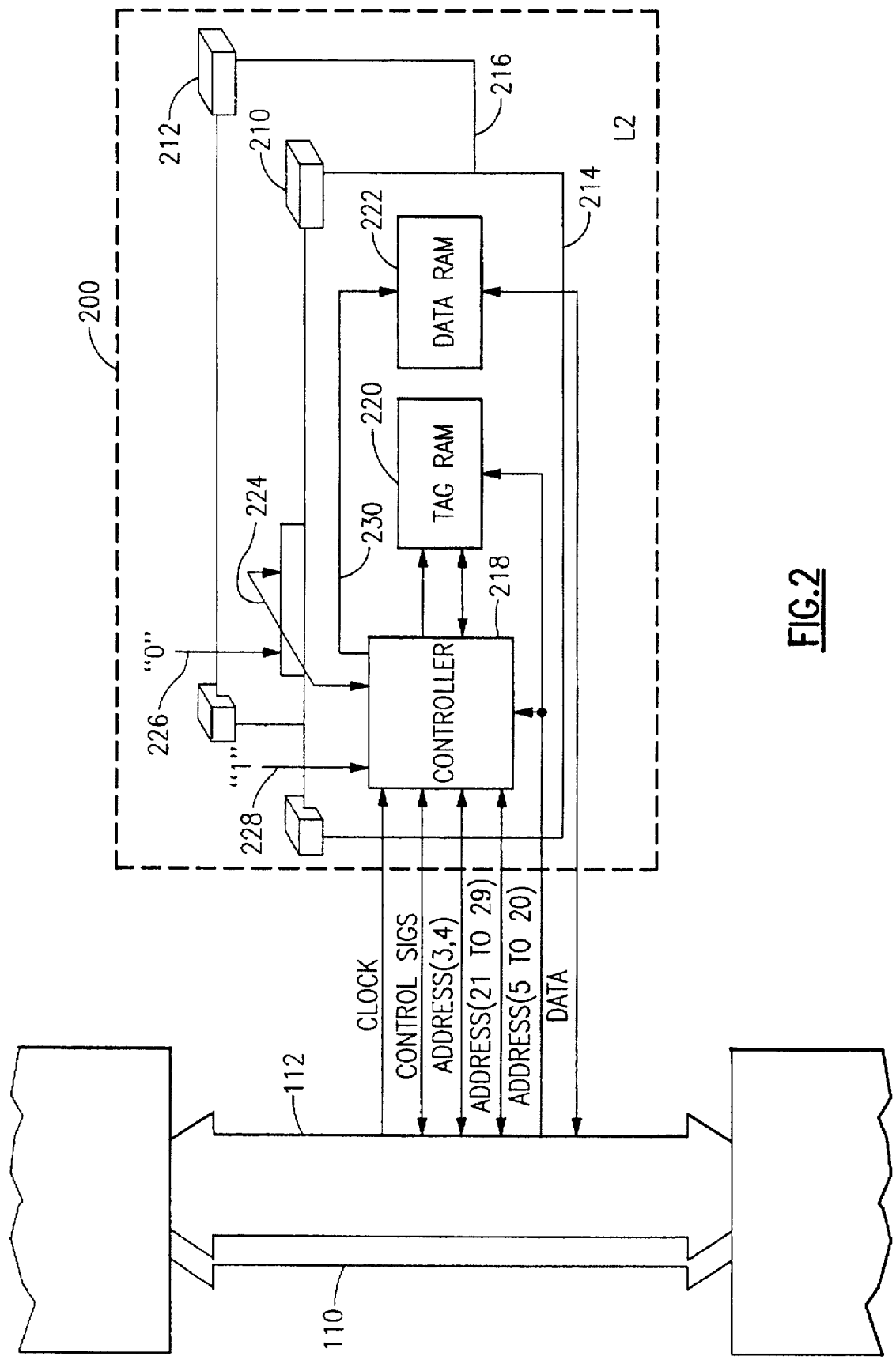
FIG. 2 is a more detailed block diagram of the $L_2$ cache shown in FIG. 1.

As shown in FIG. 2, the motherboard 200 contains two connectors 210 and 212 for receipt of one or two $L_2$ cache memory cards 214 and 216. The cards 214 and 216 are identical. They each contain three basic components, a controller 218, a TAG RAM 220 and a data RAM 222. The data RAM 222 stores the data and instructions of the CPU 120. The TAG RAM 220 stores address bits and operational state of data in the storage elements of the data RAM 222. The controller 218 uses the information in the TAG RAM to determine whether the data in the data RAM 222 can be transmitted to the CPU 120.

Figure 3:
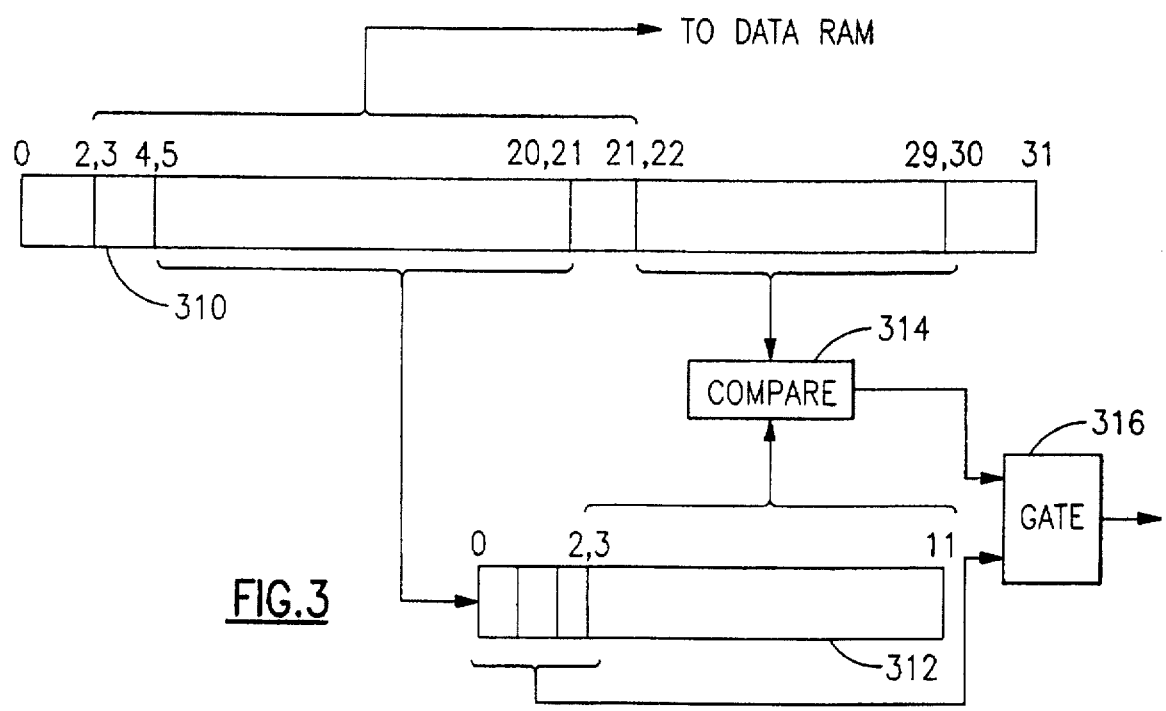
FIG. 3 is a schematic representation of addressing circuitry in the controllers of the $L_2$ cache memory cards shown in FIG. 2.

Referring to FIG. 3, of the 32-bit CPU address word 310, bits 3 to 29 are pertinent to the operation of the $L_2$ cache. Bits 0 to 2 are for a byte address in a word. The $L_2$ cache is addressable only down to the word level so bits 0 to 2 are not pertinent. Bits 30 and 31 are for addresses above the gigabyte range which are not used in the present system. Therefore bit 29 is the highest order bit in the system.

Referring to both FIGS. 2 and 3, controller 218 addresses the data RAM 222 on line 230 with bits 3 to 20. Bits 5 to 20 select a 32 byte line of the data RAM 222 and bits 3 and 4 select the requested 8 byte word of that line. The CPU 120 also addresses the TAG RAM 220 with bits 5 to 20 of the address 310. This reads a 12 bit word 312 out of the TAG RAM which includes the high order address bits 21 to 29 of data stored in RAM 222. A compare circuit 314 in the controller 218 determines if there is a match between the stored and requested address bits. If there is a match, a gate 316 transmits state bits 0 to 2 of the TAG RAM word 312 to other circuitry to determine status of data stored in RAM 222. If the access in the data RAM 222 is the requested address, the status bits determine the accessibility of that location to a read or write operation by the CPU 120. When bit 0 is a "0" the location is read only. When it is "1" it is writable. When bits 1 and 2 are "1, 1" respectively, the data are modified (M) from the copies of the data in the RAM. When they are "0, 1" the data are exclusive (E) and can be modified. When bits 1 and 2 are "1, 0" the data are shared (S) and cannot be modified and when they are "0, 0" the data are invalid.

When there is only one memory card 214 in the motherboard 200, that card must respond to address requests over the entire range addressed by bits 3 to 29. However, when the second memory board 216 is added, the first board 214 responds to only half the address range. When address bit 21 is "0" the data RAM 222 on card 214 is to be accessed. When address bit 21 is "1" the data RAM in memory card 216 is to be accessed.

Figure 4:
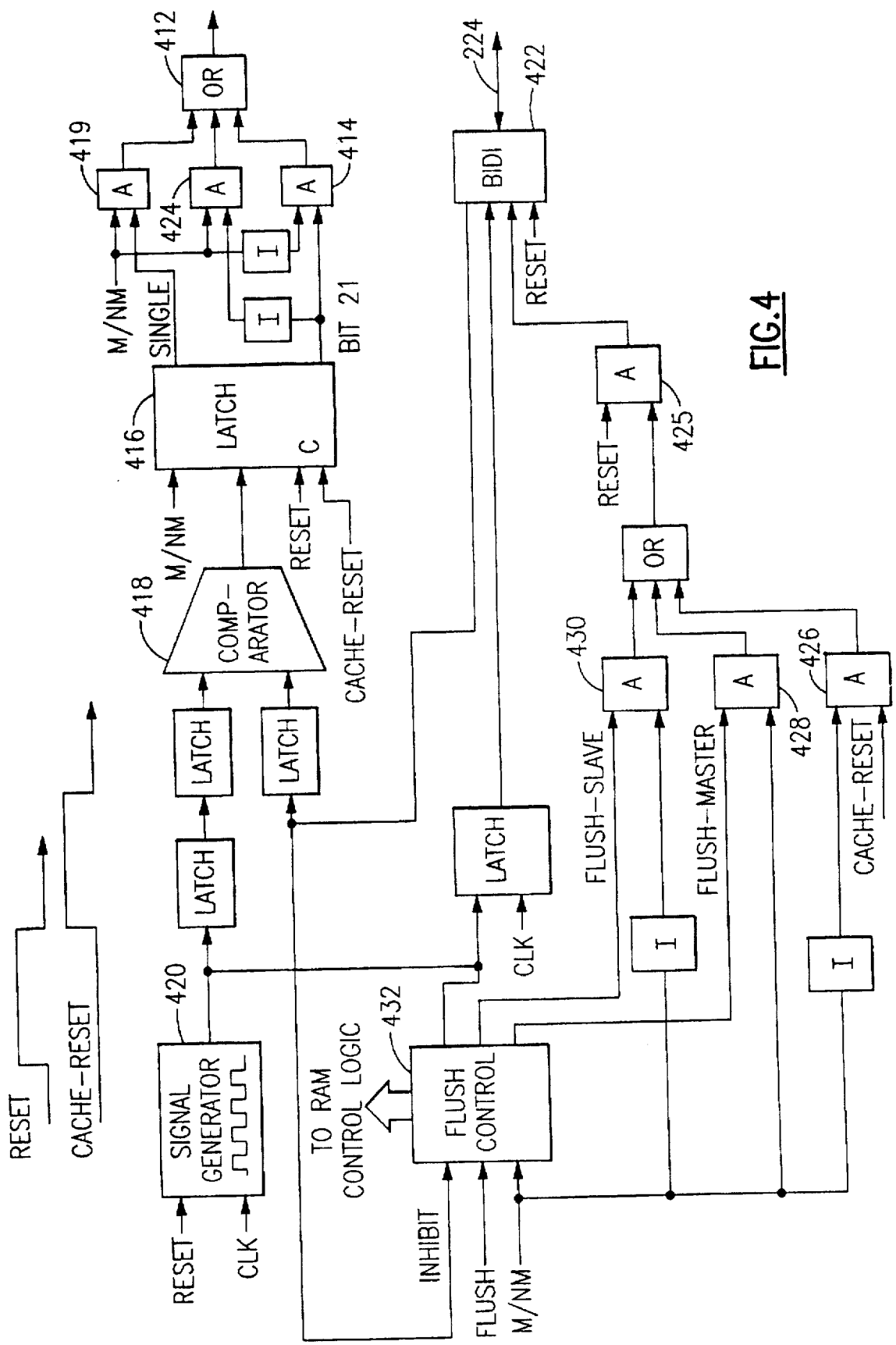
FIG. 4 is a logic diagram of $L_2$ memory board circuitry for allocation of memory addresses.

In accordance with the present invention, means are provided, as shown in FIGS. 2 and 4, to permit changes in accessing in the $L_2$ cache with changes in the number of cache memory modules installed in the motherboard. First referring to FIG. 2, a line referred hereinafter as the "buddy" line 224 is provided that goes through the motherboard 200 and the connectors 210 and 212 between the controllers on the two modules 214 and 216. Further, the controllers of the modules are provided with different one bit binary indicia 226 and 228 from the motherboard 200 to denote the status of the memory card either as a master or a slave. These signals are the master/not master signals (M/NM). The master 214 receives a binary "1" M/NM signal from the motherboard through connector 210 and the slave 216 receives a binary "0" M/NM signal from the motherboard 200 through connector 212.

Now referring to FIG. 4, it will be seen that the controllers on both memory cards 214 and 216 contain circuitry responsive to the binary M/NM signals 226 and 228, the address bit 21, and a reset command from the system, to set the address range of the cards. On the slave card, enablement of the drivers of the data RAM 222 is always limited to responding to half of the address range. When the address bit 21 is "1" that bit in combination with the inverted "0" M/NM signal enables gate 414.

On the master card, gate 412 enables the data RAM drivers to pass any address in the entire address range unless there is a slave card 216 in socket 212. More specifically, without a slave card in socket 212 of the motherboard, the output line of latch 416 or "single" line is a "1" which in combination with the "1" M/NM signal enables AND gate 419. When there is a slave card in the socket 212, a compare output signal is provided to latch 416 by comparator 418 resulting in a "0" output on the "single" line of latch 416 disabling the gate 419.

The comparator 418 responds to signal generators 420 on both cache memory cards. The signal generators are both activated on the falling edge of the system reset pulse to generate synchronized pulse sets. On the slave card 216 the binary "0" M/NM signal 226 sets the bidirectional (BiDi) circuit 422 through AND gates 425 and 426 to transmit the pulse set from its signal generator 416 to the master card 214. The binary "1" M/NM signal supplied to the master card 214 allows the BiDi circuit 422 on the master card to receive the pulse set transmitted from the slave card. When synchronized pulse sets from both the master and slave are provided to the comparator circuit 418 on the master it produces a compare output. The compare output in combination with the cache-reset signal latches latch 416 dropping the "single" line disabling the gate 419. The master card gate 424 is enabled by a binary "0" in address bit position 21 in combination with a binary "1" M/NM signal allowing enablement of the drivers of the data RAM irrespective of the state of gate 419. Therefore, the drivers are always enabled for low end addresses.

The buddy line can be used for other purposes. For instance, it is also used during a flush operation where the controller for the RAM 118 directs the $L_1$ and $L_2$ caches to transfer to the RAM 118 modified data (changed from the copy of the data in RAM 118). As shown in FIGS. 4 and 5, when the master receives the start flush command, AND gates 428 and 425 activate the BiDi 422 to allow the flush control circuitry 432 on the master to drive the buddy line 224 active. This sends a "buddy" signal to the slave from the flush control logic 432 of the master. The buddy signal inhibits the flush operation by the flush control logic 432 in the slave while the master performs its flush process. When master finishes its flush process on clock cycle 6 it allows the buddy line to go inactive for 1 cycle and then through AND gate 426 releases the buddy line in cycle 7. When the slave senses the buddy line as inactive it drives the buddy line active on cycle 8. When the slave finishes its flush process, it drives the buddy line inactive. The master senses the buddy line 224 as being inactive and provides an $L_2$ complete signal to the CPU.

Above we have described one embodiment of the invention in which either one or two identical memory cards can constitute a cache. A number of changes can be made in this embodiment without departing from the invention. For instance, the memory could use different designs for master and slave cards. In such a case the buddy line could be used to transmit information from the slave to the master about the configuration of the slave. Also provisions could be made for expansion to more than two cards by using more than one buddy line and multiple digit binary numbers to code the cards. Therefore, it will be understood by those skilled in the art that the above and other changes in form and details may be made without departing from the spirit and scope of the invention.

The invention claimed is:

1. In a computer system having a main memory with a real address range and a cache memory which stores data of any real address in the whole main memory address range, in which the number of addressable locations in the cache memory is changed by the addition and removal of memory array cards at an interface having a plurality of memory card slots, the improvement comprising apparatus for adjusting the address range of any installed memory array card in response to changes in the number of array cards forming the cache memory comprising:

a) indicia means in the interface assigning status, as either a master card or a slave card, to an installed array card, depending on what memory card slot that installed memory array card is placed in the interface;

b) circuit means in the interface to convey to such a master card the presence or absence of a slave card at the interface; and c) gate means on the cards responsive to signals from said indicia means and circuit means to allocate access requests to the master card for the whole main memory address range or a portion thereof on the basis of its status as a master and the presence or absence of a slave card at the interface and to allocate to the slave card only a portion of the whole specified address range on the basis of its status as a slave card whereby the address range adjustment of the installed memory array cards is transparent to the computer system.

2. The computer system of claim 1 wherein said circuit means and gate means are the same on both master and slave cards.

3. The computer system of claim 1 wherein said indicia means provides a different binary signal to the installed memory array cards depending on the slot the memory array card is inserted into.

4. A cache memory, with storage locations arranged on one or more memory cards which cache memory stores data from any real memory address irrespective of the number of memory cards, comprising:

a) a multiple connection means each for the receipt of one memory card;
 b) multiple binary signal means associated with each connection means to provide a unique binary signal to a memory card inserted into that connection means to inform the memory card of its status as either a master card or a slave card;
 c) signal means on each memory card for generating a signal;
 d) interconnection means connecting said multiple connection means together to transmit the generated signal by the signal means on a slave card to said master card in response to said unique binary signals; and
 e) gate means on each card responsive to said binary signal on each card and responsive to the generated signals to allocate access requests to the master card for the whole range of main memory addresses or a portion thereof on the basis of its status as a master and the presence or absence of a slave card and to a slave card for only a portion of the whole range of main memory addresses on the basis of its status as a slave card whereby the address ranges of the memory cards are changed without intervention of a computer system containing the cache memory.

5. The cache memory of claim 4 including:

bidirectional circuit means on both memory cards for allowing signals to move along the interconnection means in either direction.

6. The cache memory of claim 5 including:

a) means for generating flush signals on each card; and
 b) gate means for activating the bidirectional circuit means to signal sequential flushing of said master and slave cards.

7. In a cache memory in which the capacity of the cache memory is changed by the addition and removal of cache memory modules at an interface with a computer buss system, apparatus for coordinating the cache memory modules response to computer instructions and for transmission of information therebetween comprising:

a) interconnection means in said cache memory module outside said computer bus system, coupling module sites in the interface together to transmit information concerning the presence or absence of any module in one module site to a module at another site without involvement the computer containing the bus system; and
 b) gate means in a module at said another module site for changing the portion of the range of addresses on the computer buss system which module at said another module site will respond to depending on the number of cache memory modules installed at the interface with the bus system.

8. The apparatus of claim 7 including modules in said module sites containing bidirectional gating means for transferring information in both directions along said interconnection means between modules when different ones of said modules are located at both said one module site and said another module site.

9. The computer system of claim 2 including:

signal means on each memory array card for generating a signal.

10. The computer system of claim 9 wherein:

said circuit means includes interconnection means connecting said memory card slots together to transmit the signal generated by the signal means on a slave card to said master card; and wherein:
 the gate means on each memory array card is responsive to the presence or absence the generated signals to allocate access requests to the master card on the basis of its status as a master and the presence or absence of a slave card.

11. The computer system of claim 10 including:

bidirectional circuit means on both memory cards for allowing signals to move along the interconnection means in either direction.

12. The computer system of claim 11 including:

a) means for generating a flush signal on each card in response to requests by the computer system; and
 b) gate means for activating the bidirectional circuit means to signal sequential flushing of said master and slave cards by inhibiting generation of the flush of the slave card until flushing of the master card is completed.

13. The computer system of claim 12 wherein said interconnection means is independent of the buss system for the computer system.

\* \* \* \* \*